United States Patent [19]

Takao

[11] Patent Number: 4,764,860

[45] Date of Patent: Aug. 16, 1988

[54] SERVO CIRCUIT FOR AN INFORMATION RECORDING AND/OR REPRODUCING APPARATUS

[75] Inventor: Hajime Takao, Hamamatsu, Japan

[73] Assignee: Nippon Gakki Seizo Kabushiki Kaisha, Hamamatsu, Japan

[21] Appl. No.: 870,074

[22] Filed: Jun. 3, 1986

[30] Foreign Application Priority Data

Jun. 26, 1985 [JP] Japan .................. 60-139798
Jan. 20, 1986 [JP] Japan .................. 61-5034[U]

[51] Int. Cl.$^4$ .................. G11B 7/08; G11B 21/10
[52] U.S. Cl. .................. 369/43; 360/78; 369/50; 369/54
[58] Field of Search .................. 250/201; 369/44–46, 369/43, 32, 33, 50, 54, 53, 56; 358/342, 907; 360/77, 78

[56] References Cited

U.S. PATENT DOCUMENTS

| | | | |
|---|---|---|---|
| 4,344,165 | 8/1982 | Akiyama | 369/44 |
| 4,406,000 | 9/1983 | Shoji et al. | 369/44 |
| 4,475,182 | 10/1984 | Hosaka | 369/45 |
| 4,536,864 | 8/1985 | Van Rosmalen | 369/44 |
| 4,562,562 | 12/1985 | Moriya et al. | 369/32 |
| 4,567,533 | 1/1986 | Assink | 358/342 |
| 4,580,255 | 4/1986 | Inoue et al. | 369/44 |
| 4,587,644 | 5/1986 | Fujiie | 369/44 |
| 4,614,863 | 9/1986 | Sato | 369/44 |
| 4,703,468 | 10/1987 | Baba et al. | 369/44 |

OTHER PUBLICATIONS

WO-A-8-501 605 (Sony Corp), Whole document, EP-A-0 160 095 (11/2/85).
EP-A-0 095 766 (Hitachi Ltd), p. 8, line 19–p. 31, line 12, (5/30/83).
Patents Abstracts of Japan, vol. 8, No. 141 (P-283) [1578], Jun. 30, 1984; & JP-A-59 38 936 (Sony K.K.) 3/3/84, Abstract.
Patents Abstracts of Japan, vol. 9, No. 109 (P-355) [1832], May 14, 1985; and JP-A-59 229 773 (Pioneer K.K.) 12/24/84, Abstract.
Patents Abstracts of Japan, vol. 8, No. 33 (P-254) [1470], Feb. 14, 1984; and JP-A-58 188 339 (Sony K.K.) 11/2/83, Abstract.
FR-A-2 520 543 (Sony Corp), p. 11, line 11–p. 17, line 6; figures 5,6 (1/24/83).

Primary Examiner—Donald McElheny, Jr.
Attorney, Agent, or Firm—Spensley Horn Jubas & Lubitz

[57] ABSTRACT

A servo circuit for an information recording and reproducing apparatus such as a Compact Disc player detects relative mechanical vibrations of a pickup head with respect to a recording medium and changes a servo loop gain for positioning the pickup head to a high gain when the level of the detected mechanical vibration is high to obtain a high servo capacity and changes the servo loop gain to a low gain when the mechanical vibration is low to reduce power consumption and thereby minimize generation of heat. In one embodiment of the invention, an error signal due to mechanical vibration and one due to recording medium conditions such as spots and flaws of a disc are discriminated from each other by detecting acceleration applied to a main body of the apparatus. When the level of acceleration is large, the error signal is regarded to have been caused by the mechanical vibration and the servo loop gain is changed to a high gain whereas when the level of acceleration is small but the error signal is large, the error signal is regarded to have been caused by recording medium conditions and the servo loop gain is changed to a lower gain than normal.

14 Claims, 8 Drawing Sheets

SERVO CIRCUIT FOR AN INFORMATION RECORDING AND/OR REPRODUCING APPARATUS

BACKGROUND OF THE INVENTION

This invention relates to a servo circuit performing servo controls such as a focus servo and a tracking servo for controlling relative position between a recording medium and a pickup head in an information recording and/or reproducing apparatus such, for example, as a Compact Disc player for the Compact Disc Digital Audio System, a video disc player and a tape recorder and, more particularly, to a servo circuit of this type capable of reducing electric power consumption without degrading servo faculty by changing the gain in the servo loop in accordance with disturbances such as external vibrations and eccentricity or warping of the disc.

In a Compact Disc player to be mounted in an automobile, for example, floating of the mechanism unit from a source of vibration and increase in the servo capacity in reading a signal from the disc is required for satisfying anti-vibration property of the player. For increasing the servo capacity, it is necessary to increase servo gain of a focus actuator control and a tracking actuator control of a pickup head within a range in which stability of the servo circuit can be secured.

If the servo gain is increased, however, electric current flowing through these actuators increases and thereby generates considerable heat in the pickup head. As a result, the output of a laser beam oscillator in the pickup head changes and this adversely affects the servo gain characteristics with resulting shortening of the life of the laser beam oscillator. Besides, increase in electric current results in a greater load applied to the power source and a larger power consumption.

Such inconveniences arise not only in a Compact Disc player but also in other information recording and/or reproducing apparatus such as a tape recorder in which the position of a pickup head with respect to a recording medium is controlled by means of a servo loop.

SUMMARY OF THE INVENTION

It is, therefore, an object of the invention to provide a servo circuit eliminating the above described disadvantage in the prior art servo circuit in an information recording and/or reproducing apparatus and being capable of reducing power consumption without sacrificing the servo capacity.

The servo circuit achieving the object of the invention is characterized in that it comprises vibration detection means for detecting relative mechanical vibrations of a pickup head with respect to a recording medium and producing a first gain changing signal for changing a servo loop gain for positioning the pickup head to a high gain when the level of the detected mechanical vibrations is higher than a predetermined value and a second gain changing signal for changing the servo loop gain to a low gain when the level is lower than the predetermined value and gain changing means responsive to the first and second gain changing signals for changing the servo loop gain between the high gain and the low gain.

According to the invention, the servo loop gain is changed in accordance with the magnitude of mechanical vibration and this brings about the following advantageous results. Firstly, in a normal operation of the pickup head in which the magnitude of the mechanical vibration is relatively small, the servo loop gain is held at a low value and, accordingly, power consumption is small. This is beneficial because generation of heat in the pickup head is held at a minimum whereby the life of the laser beam oscillator mounted in the pickup head is prolonged and radiation of heat from the drive circuit is facilitated. Besides, the power source circuit can be made in a compact design. Further, the adverse effect on the anti-vibration characteristics due to dropping in the servo loop gain which is developed by the rise in the temperature of the pickup head is eliminated. On the other hand, when the magnitude of the mechanical vibration becomes larger, the servo loop gain is increased with resulting increase in the servo control capacity.

BRIEF DESCRIPTION OF THE DRAWINGS

In the accompanying drawings.

DESCRIPTION OF PREFERRED EMBODIMENTS

Figure 1:
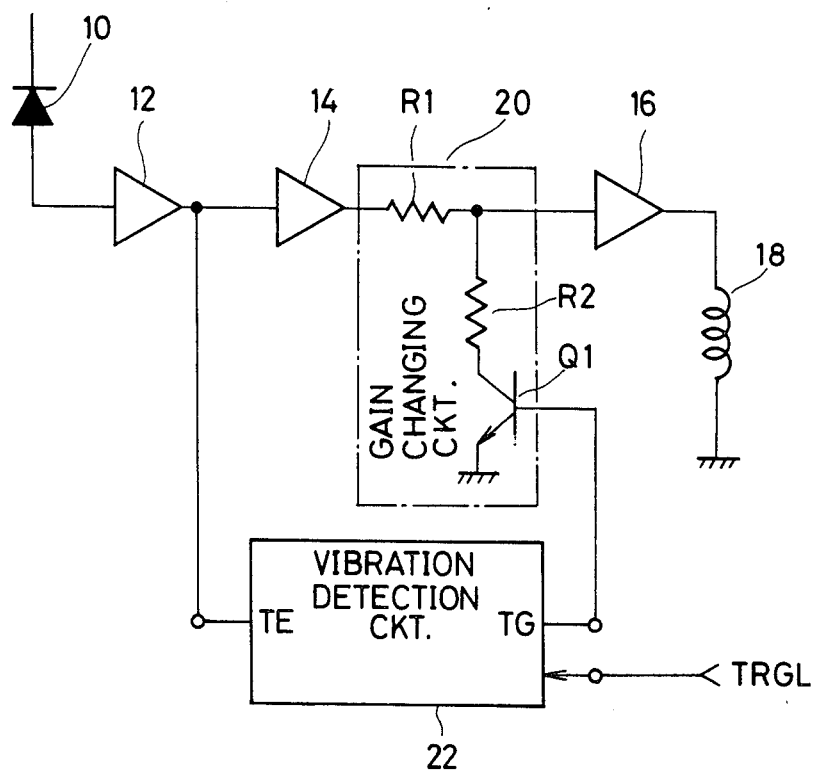
FIG. 1 is a block diagram showing an embodiment of the servo circuit according to the invention.

FIG. 1 shows an embodiment of the servo circuit according to the invention. In this embodiment, the mechanical vibration is detected based on a tracking error detection signal and the gain of a tracking servo loop is changed in accordance with the level of the detected mechanical vibration.

In FIG. 1, a PIN diode 10 is provided in a pickup head and this diode 10 produces a signal corresponding to a tracking error (i.e., a tracking error detection signal). This tracking error detection signal corresponds to a relative mechanical vibration of the pickup head with respect to a track of a disc. The tracking error detection signal produced by the PIN diode 10 is supplied to a tracking actuator 18 through a preamplifier 12, a phase compensating amplifier 14, a gain changing circuit 20 and a drive amplifier 16 to reduce the tracking error.

The gain changing circuit 20 is composed of resistors R1 and R2 and a transistor Q1 and the servo gain becomes a high gain when the transistor Q1 is OFF whereas, when the transistor Q1 is ON, the output voltage of the amplifier 14 is divided by the resistors R1 and R2 and thereby the servo gain becomes a low gain.

A vibration detection circuit 22 is provided for supplying the gain changing circuit 20 with a control signal TG used for changing the gain. The circuit 22 detects the level of relative mechanical vibration between the track of the disc and the pickup head on the basis of the magnitude of the tracking error detection signal and produces a gain changing signal TG which is "0" when the level of the mechanical vibration is higher than a predetermined threshold value and thereby causes the gain changing circuit 20 to produce the high gain whereas the circuit 22 produces the gain changing signal TG which is "1" when the level of the mechanical vibration is lower than the threshold value and thereby causes the gain changing circuit 20 to produce the low gain.

Accordingly, when the level of the vibration is high, excellent control characteristics can be obtained due to the high servo capacity whereas when the level of the vibration is low, power consumption is decreased so that generation of heat in the tracking actuator 18 is decreased with resulting prolongation of the life of the laser beam oscillator and reduction in the load applied to the power source circuit.

A high gain setting signal TRGL is applied to the vibration detection circuit 22 for compulsorily switching the servo loop gain to a high one after a track jump operation in searching a track in a case where a piece of music or the like information is selected or the position of the pickup head has deviated out of the range in which the tracking servo control is possible.

Figure 2:
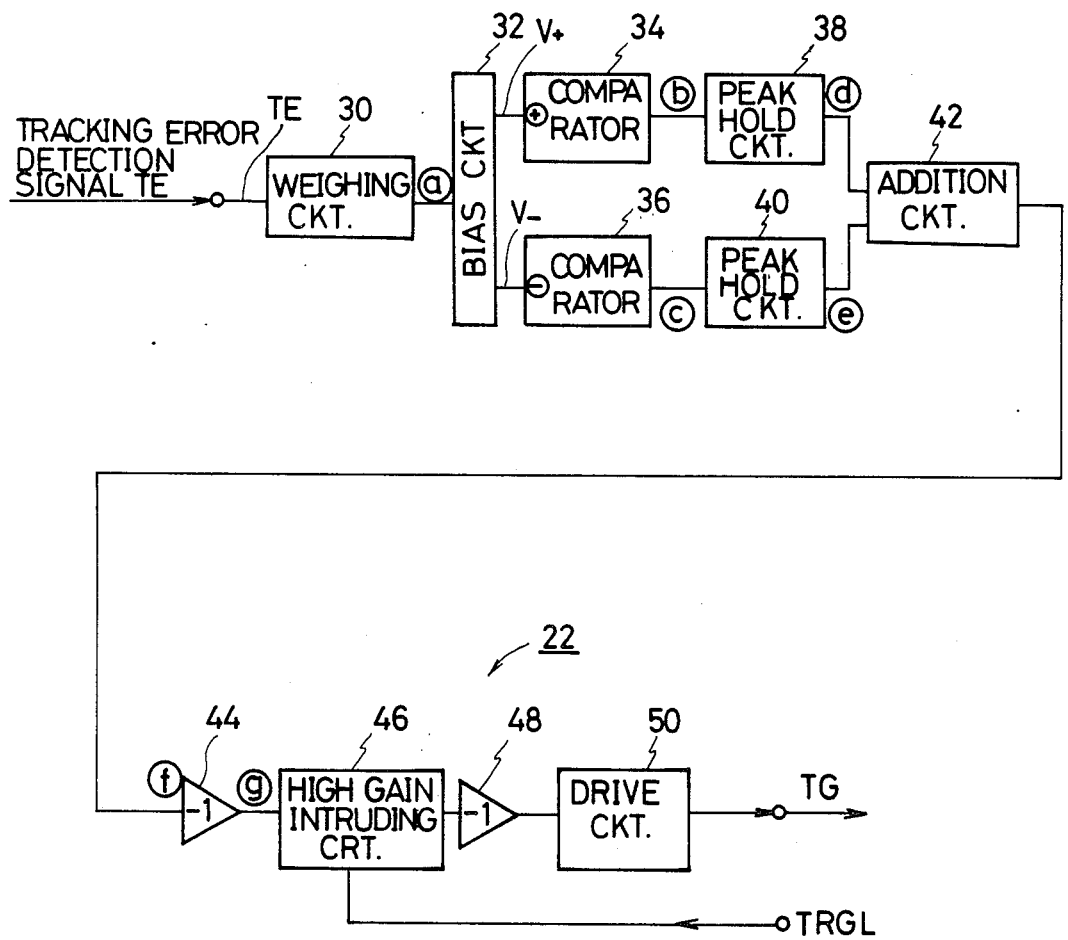
FIG. 2 is a block diagram showing an example of a vibration detection circuit 22 in FIG. 1.

A specific example of the vibration detection circuit 22 in FIG. 1 is shown in FIG. 2. In FIG. 2, a tracking error detection signal TE is applied to a weighting circuit 30. The weighting circuit 30 is a filter circuit passing only a frequency component corresponding to external vibration applied to the main body of an information recording and/or reproducing apparatus such as a Compact Disc player mounted in an automobile or eccentricity or warping of the disc and prohibits passing of other frequency component.

A bias circuit 32 produces upper and lower threshold values V+ and V− for changing the gain. Setting of these threshold values is important in the servo circuit of the invention. From the point of view of anti-vibration characteristics, it is preferable to have anti-vibration characteristics substantially equivalent to the high gain mode at all times. If, however, the threshold values V+ and V− are small, there will occur the high gain mode for most of time and the purpose of the invention will not be attained. The threshold values V+ and V− therefore must be as large as possible within a range in which the anti-vibration characteristics can be satisfied. The threshold values V+ and V− are determined in consideration also of the value of the gain in the low gain mode. If the value of the gain in the low gain mode is low, the changing of the gain can only follow vibration of a small magnitude and, accordingly, the threshold values V+ and V− must be made small. If, conversely, the value of the gain in the low gain mode is high, the changing of the gain can follow vibration of a larger magnitude so that the threshold values V+ and V− can be determined at higher values.

Comparators 34 and 36 repectively compare the tracking error detection signal TE through the weighting circuit 30 with the threshold values V+ and V− set by the bias circuit 32. Peak hold circuits 38 and 40 so function that, when the comparators 34 and 36 have each detected a state in which the tracking error detection signal TE exceeds the threshold value V+ or V−, they hold the outputs of the comparators 34 and 36 for a predetermined period of time corresponding to a period of time during which the tracking actuator 18 (FIG. 1) is controlled and converged and a high gain state is maintained during this time.

The outputs of the peak hold circuits are ORed by an addition circuit 42 and the output of the addition circuit 42 is inverted by an inverter 44 and thereaftrer is applied to a high gain intruding circuit 46.

The high gain intruding circuit 46 compulsorily changes the servo loop gain to a high gain by a high gain setting signal TRGL after a track jump operation in searching a track in a case where a piece of music or the like information is selected or where the external vibration is so strong that the pickup head has deviated from the tracking servo range.

The output signal of the high gain intruding circuit 46 is applied to a drive circuit 50 through an inverter 48 to drive the circuit 50. The output signal TG of the drive circuit 50 is used for turning on and off the transistor Q1 of the gain changing circuit 20 in FIG. 1 thereby to change the servo loop gain.

Figure 3:
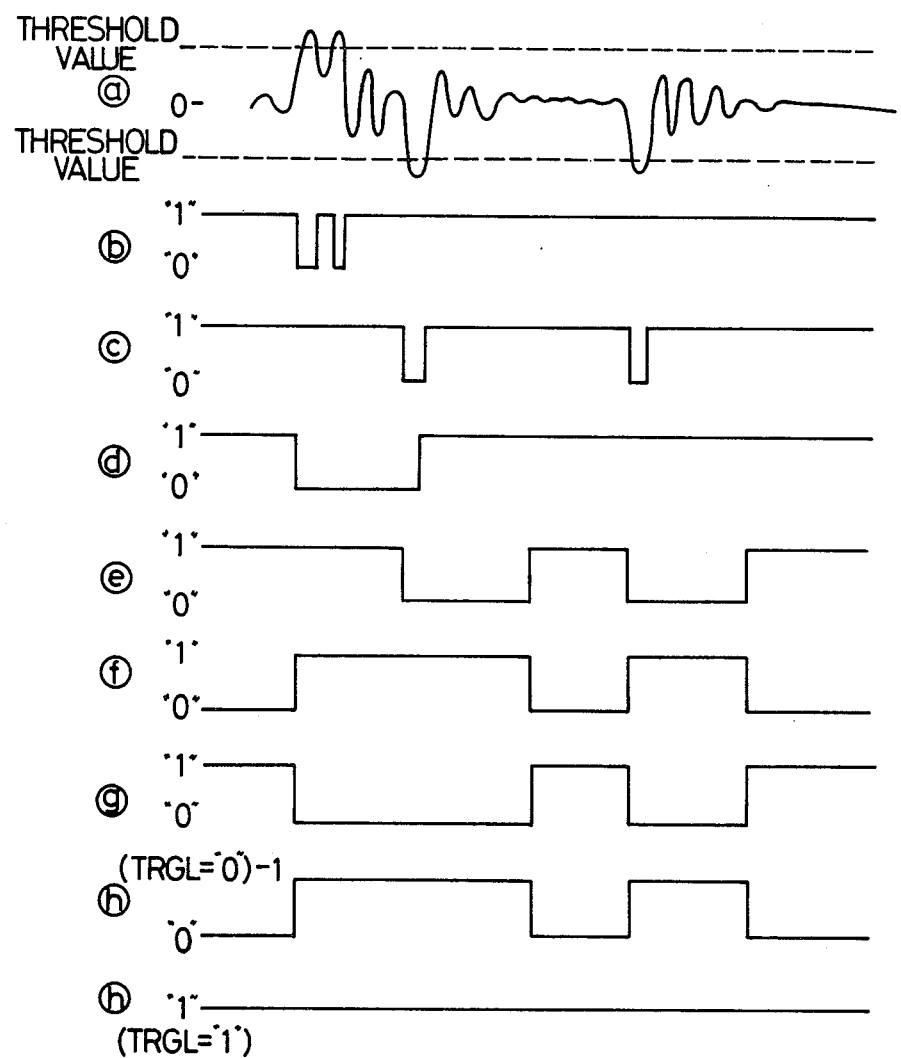
FIG. 3 is a waveshape diagram showing the operation of the vibration detection circuit 22 in FIG. 2.

The operation of the circuit of FIG. 2 is shown in FIG. 3. In FIG. 3, a-h are waveshapes appearing in portions designated by the same reference characters in the circuit shown in FIG. 2.

When the tracking error detection signal TE is smaller than the threshold values V+, V− set by the bias circuit 32, the outputs of the comparators 34 and 36 are "1" so that the output of the drive circuit 50 is "1". The transistor Q1 of the gain changing circuit 20 (FIG. 1) therefore is turned on and the tracking servo loop is switched to the low gain.

When the tracking error detection signal TE is larger than the threshold value V+ or V−, the output of the corresponding comparator 34 or 36 becomes "0" and this output is held by the peak hold circuit 38 or 40 for a certain period of time. During this time, the output of the drive circuit 50 is "0" and the transistor Q1 of the gain changing circuit 20 is turned OFF so that the tracking servo loop is switched to the high gain.

Figure 4:
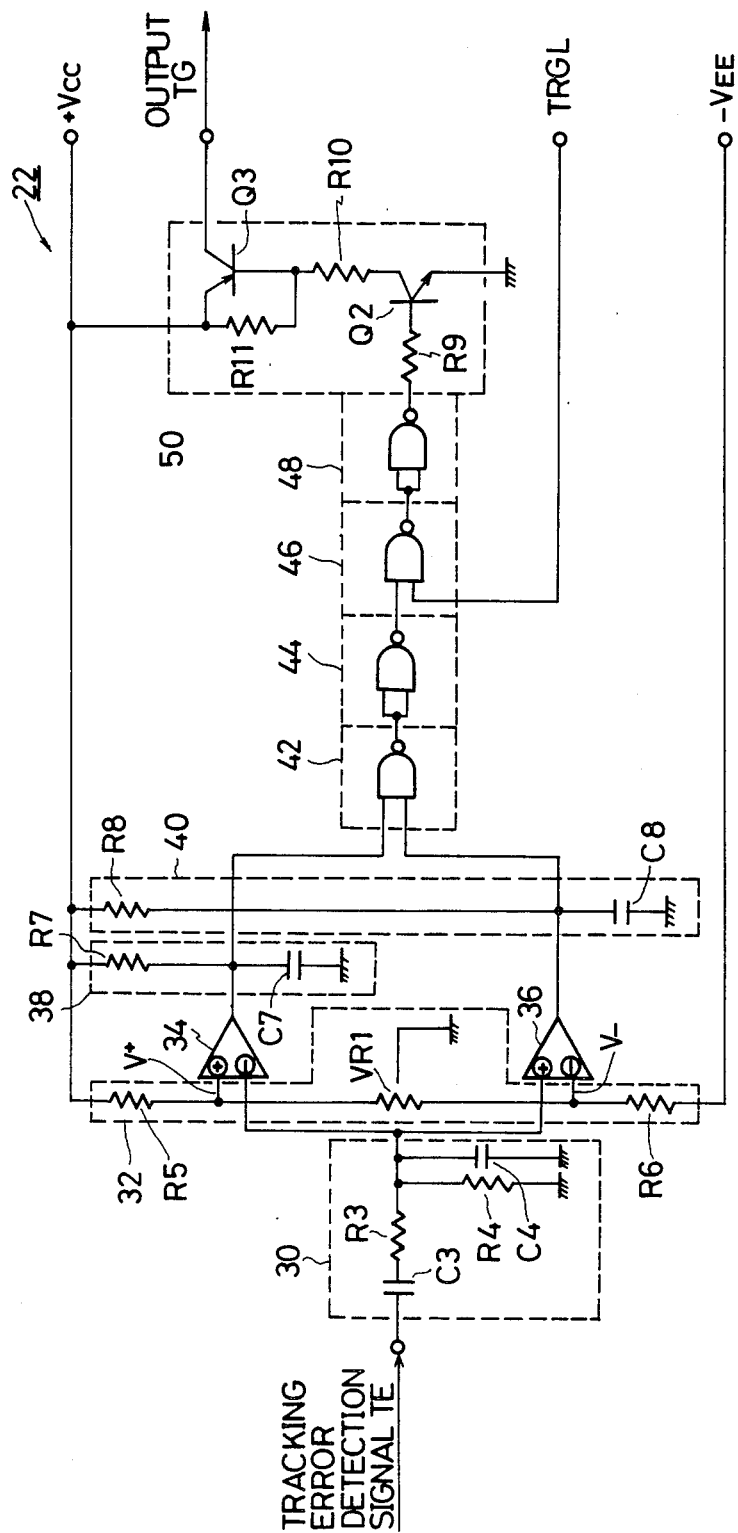
FIG. 4 is a circuit diagram showing a specific example of the vibration detection circuit 22.

A specific example of the vibration detection circuit in FIG. 2 is shown in FIG. 4.

In FIG. 4, the weighting circuit 30 consists of a filter circuit which is composed of resistors R3 and R4 and capacitors C3 and C4 and passes only a frequency component corresponding to the external vibration or eccentricity or warping of the disc.

The bias circuit 32 sets the threshold values V+ and V− by resistors R5 and R6 and a variable resistor VR1.

The peak hold circuit 38 is composed of a resistor R7 and a capacitor C7. When the positive value of the tracking error detection signal TE has exceeded the threshold value V+ and the output of the comparator 34 thereby has been turned to "0", the capacitor C7 is discharged and thereafter it is charged with a time constant determined by the resistor R7 and the capacitor C7. Accordingly, the peak hold circuit 38 provides a signal "0" for a predetermined period of time when the positive value of the tracking error detection signal TE has exceeded the threshold value V+.

The peak hold circuit 40 is composed of a resistor R8 and a capacitor C8 and provides a signal "0" for a predetermined period of time when the negative value of the tracking error detection signal TE has exceeded the threshold value V−.

The addition circuit 42 consists of a NAND circuit and produces a signal "1" when the tracking error detection signal TE has exceeded the threshold value V+ or V− and the output of the peak hold circuit 38 or 40 has thereby been turned to "0".

The output of the addition circuit 42 is applied to the drive circuit 50 through the inverter 44, high gain intruding circuit 46 and inverter 48 respectively composed of NAND circuits.

In the drive circuit 50, the output of the inverter 48 is applied to a base of the transistor Q2 through a resistor R9. An emitter of the transistor Q2 is grounded and its collector is connected to the base of a transistor Q3 through a resistor R10. The emitter of the transistor Q3 is connected to power voltage +Vcc and a resistor R11 is connected between the base and emitter of the transistor Q3. The control signal TG is delivered out of the collector of the transistor Q3.

Accordingly, when the tracking error detection signal TE has not exceeded the threshold value V+ or V−, the control signal TG in the drive circuit 50 is TG=+Vcc (="1") whereby the transistor Q1 of the gain changing circuit 20 is ON and the tracking servo loop gain is the low gain.

When the tracking error detection signal TE has exceeded the threshold value V+ or V−, the control signal TG becomes TG=+Vcc (="0") whereby the transistor Q1 of the gain changing circuit 20 is turned off and the tracking servo loop gain is switched to the high gain.

When the high gain settting signal TRGL (="0") has been applied to the high gain intruding circuit 46, the output of this circuit 46 is compulsorily turned to "1" and the tracking servo loop gain thereby is switched to the high gain.

In the above described embodiment, the mechanical vibration is detected by utilizing the tracking error detection signal. For detecting the mechanical vibration, it is also possible to utilize other signal such as a focus error detection signal.

The object of control is not limited to the tracking servo loop but other servo loop such as a focus servo loop may be controlled simultaneously.

This invention is applicable not only to the servo circuit of a Compact Disc player or a video disc player but to any servo circuit for causing a pickup head to follow up a recording medium such, for example, as a servo circuit in a tape recorder.

In the above described embodiment, the mechanical vibration is detected in accordance with the level of a servo error detection signal. It has been found that this arrangement sometimes causes inconvenience. The level of the servo error detection signal is increased due not only to the external mechanical vibration but to conditions of a recording medium (e.g. disc) such as a spot or stain caused by deposition of dust or dirt on the recording medium or a flaw or scratch on the recording medium. If the servo gain is changed to a high gain in a case where the level of the servo error detection signal has been increased due to such conditions of the recording medium, a tracking error tends to occur which results in generation of noise or data becomes undetectable with a result that a servo error detection signal bringing back the pickup head to the past side track is generated (e.g., in a case of the three-beam system, a front beam is masked and a tracking error signal bringing back the pickup head to the past side track is generated) with a result that the pickup head cannot get out of the position.

It is, therefore, necessary to clearly discriminate the external vibration from the recording medium conditions and control the servo loop gain in accordance with the result of discrimination, i.e., to change the servo loop gain to the low gain if the level of the servo error detection signal has been increased due to the recording medium conditions. Since the frequency component of the recording medium conditions is relatively high and the frequency component of the external vibration is relatively low, it is conceivable to discriminate the external vibration from the recording medium conditions based on the frequency component of a tracking error detection signal. It has however been found that a perfect discrimination between the external vibration and the recording medium conditions is not possible according to this method and the above described disadvantages tend to take place due to rise in the servo loop gain notwithstanding that this is caused by the recording medium conditions.

In the embodiment to be described below with reference to FIGS. 5 through 8, an error signal caused by the external vibration is discriminated from an error signal caused by the recording medium conditions by detecting acceleration in movement of the entire apparatus by means of an acceleration sensor. If the level of the error signal is large and the output of the acceleration sensor is also large, it is judged that the error signal is due to the external vibration and the servo loop gain is changed to a higher gain than in a normal state. If the level of the error signal is large and the output of the acceleration sensor is small, it is judged that the error signal is due to the recording medium conditions and the servo loop gain is changed to a lower gain than in a normal state so that a control for the error signal due to the recording medium condition is improved.

Figure 5:
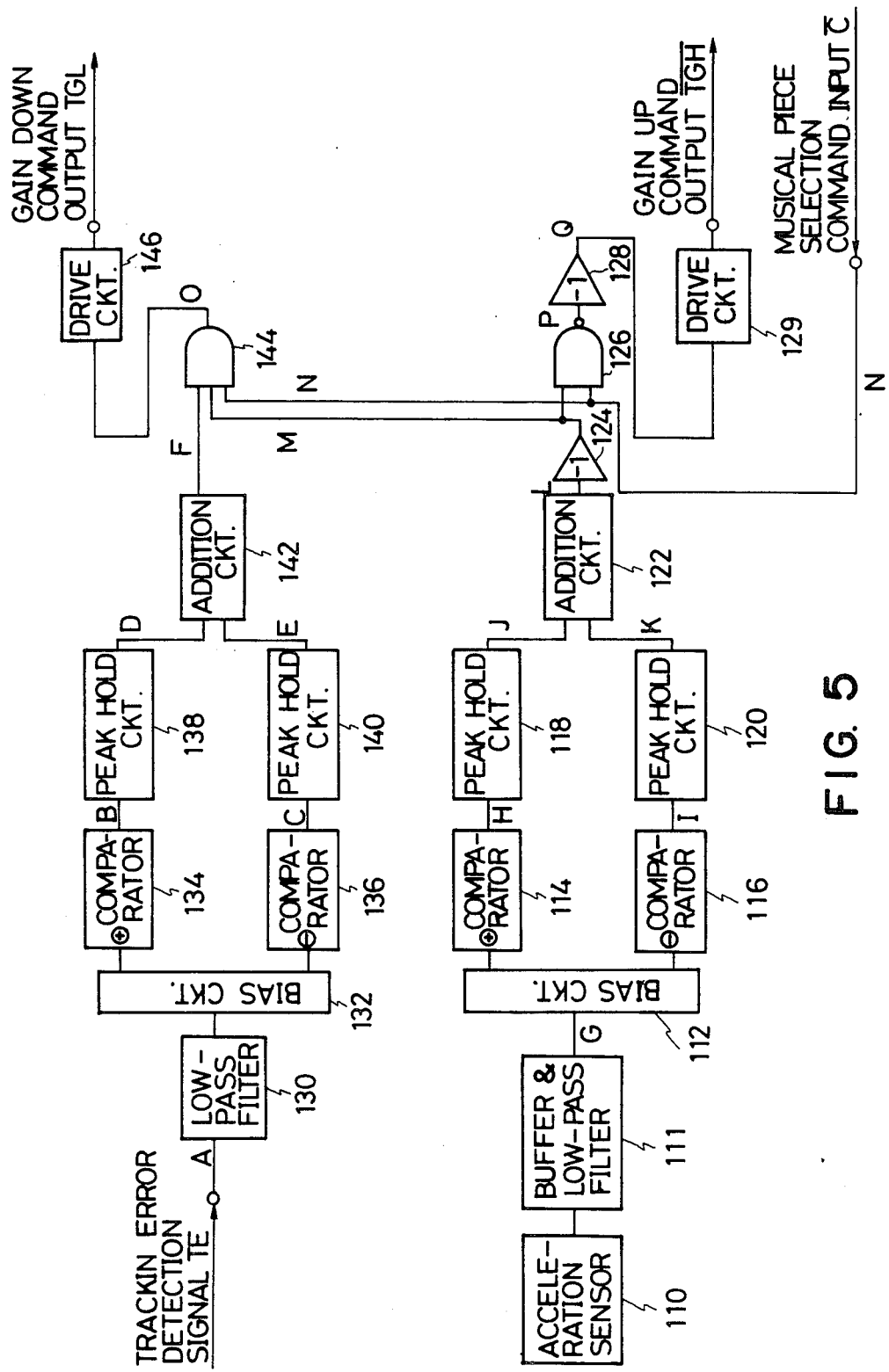
FIG. 5 is a block diagram showing another embodiment of the servo circuit according to the invention.

In FIG. 5, an acceleration sensor 110 detects acceleration in movement of the apparatus as a whole. A necessary frequency component in the output of the acceleration sensor 110 only is passed through a buffer and low-pass filter circuit 111 and applied to a bias circuit 112.

The bias circuit 112 sets threshold values of both positive and negative values for discriminating, in response to the detected acceleration, the external vibration from the recording medium conditions. Comparators 114 and 116 respectively compare the acceleration sensor output with these threshold values. When the acceleration sensor output has exceeded the positive or negative threshold value, a peak hold circuit 118 or 120 holds the output of the corresponding comparator 114 or 116 for a predetermined period of time corresponding to a period of time during which the movement of a tracking actuator (not shown) is controlled and converged by the servo voltage.

The outputs of the peak hold circuits 118 and 120 are ORed by an addition circuit 122 and inverted by an inverter 124. The output of the inverter 124 becomes "1" when the acceleration is smaller than the threshold value and "0" when the acceleration is larger than the threshold value.

A NAND circuit 126 receives the output of the inverter 24 and a music piece selection command $\overline{C}$ ($\overline{C}$="0" when a piece of music has been selected) and produces a signal "0" when the output of the inverter 124 is "1" (i.e., the detected acceleration is smaller than the threshold value) and the music piece selection command $\overline{C}$ is "1" (i.e., there is no music piece selection command) whereas it produces a signal "1" in other conditions (i.e., when the music piece selection command has been given or when there is no music piece selection command and the detected acceleration is larger than the threshold value).

The output of the NAND circuit 126 is inverted by an inverter 128 and thereafter is provided through a drive circuit 129 as a gain up command $\overline{TGH}$ (the servo loop gain is changed to the high gain when $\overline{TGH}$ is "0"). When the acceleration, i.e., the external vibration, is smaller than the threshold value and there is no music piece selection command, the gain up command $\overline{TGH}$ is "1" so that the servo loop gain is not changed to the high gain. When the acceleration has exceeded the threshold value, the gain up command $\overline{TGH}$ is turned to "0" so that the servo loop gain is changed to the high gain. During selection of a music piece, the gain up command $\overline{TGH}$ is also turned to "0" and the servo loop gain thereby is changed to the high gain for promptly stabilizing the tracking in the selected position of the music.

The circuit construction for performing a control for changing the servo loop gain to the low gain will now be described.

In FIG. 5, a tracking error detection signal TE is applied to a low-pass filter 130 where an RF signal is removed.

A bias circuit 132 sets threshold values of positive and negative values for discriminating recording medium conditions such as a flaw, spot etc. on the disc. Comparators 134 and 136 compare the tracking error detection signal TE with the positive and negative threshold values. When the tracking error signal TE has exceeded the positive or negative threshold value, a peak hold circuit 138 or 140 holds the output of the corresponding comparator 134 or 136 for a predetermined period of time corresponding to a period of time during which the pickup head passes over the flaw, spot or the like on the disc.

The outputs of the peak hold circuits 138 and 140 are ORed by an addition circuit 142. An AND gate 144 receives the output of the addition circuit 142, the output of the inverter 124 and the music piece selection command $\overline{C}$. When the tracking error detection signal TE is larger than the threshold value, the acceleration is smaller than the threshold value and the music piece selection command has not been given, it is judged that the tracking error detection signal TE is due to the flaw, spot or the like on the disc and a signal "1" is produced from the AND gate 144. This signal "1" is provided through a drive circuit 146 as a gain down command TGL (the servo loop gain is changed to the low gain when TGL is "1") and the servo loop gain thereby is changed to the low gain.

The states of the servo loop gain described above are summarized as follows:

(a) During selection of a music piece, the tracking servo loop gain is preferentially changed to the high gain.

(b) When selection of a music piece is not made, the servo loop gain is changed to the high gain if the acceleration sensor output has exceeded the threshold value.

(c) The servo loop gain is changed to the low gain if selection of a music piece is not made, acceleration sensor output is smaller than the threshold value and the tracking error detection signal has exceeded the threshold value.

(d) A normal gain is maintained if selection of a music piece is not made and neither the acceleration sensor output nor the tracking error detection signal has exceeded the threshold values. By maintaining the normal gain, the problem of generation of heat when the high gain is continued and the problem of deterioration in the servo capacity when the low gain is continued can both be eliminated.

Figure 6:
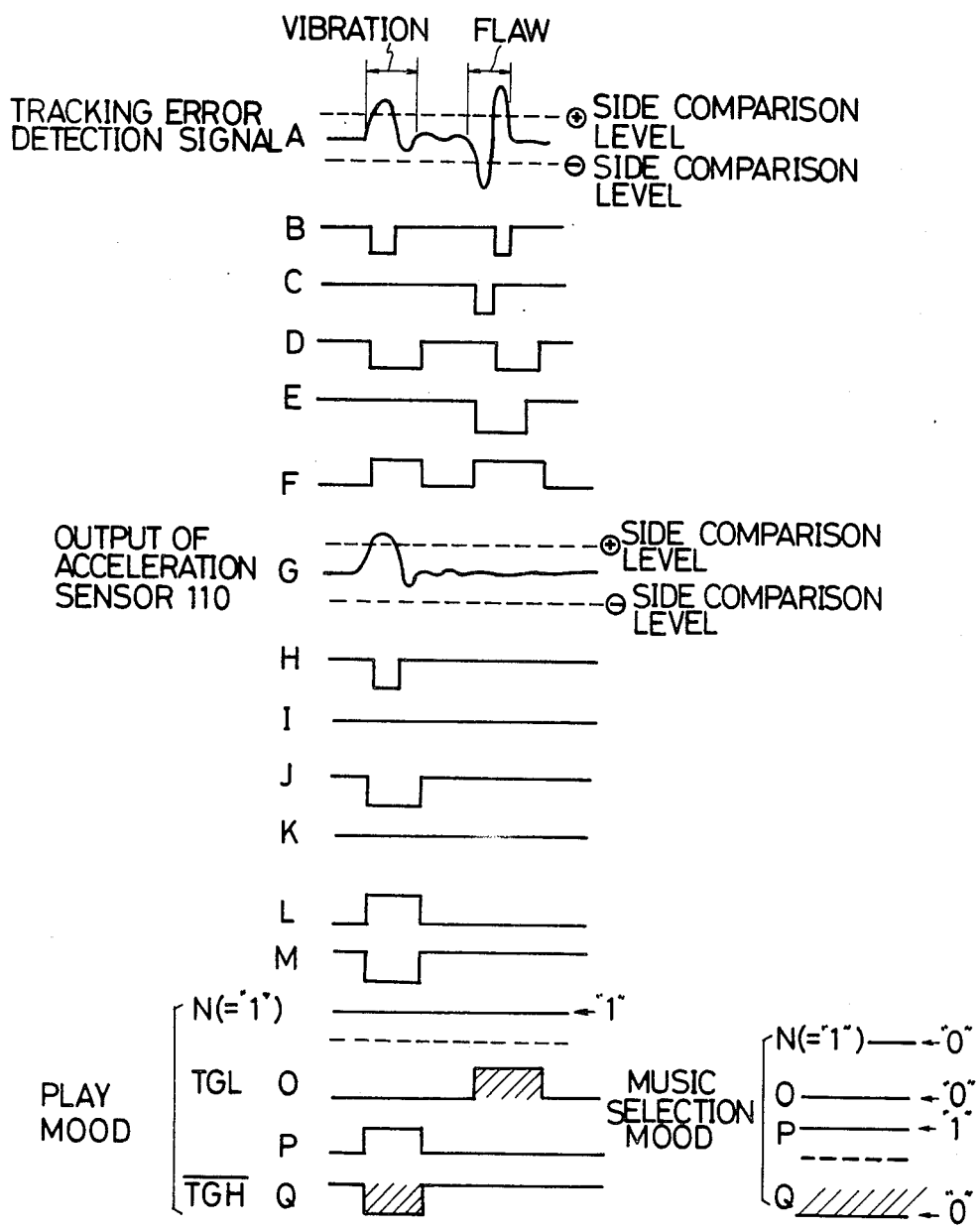
FIG. 6 is a waveshape diagram showing the operation of the circuit in FIG. 5.

Waveshapes appearing in portions designated by reference characters A-Q in FIG. 5 are shown in FIG. 6.

Figure 7:
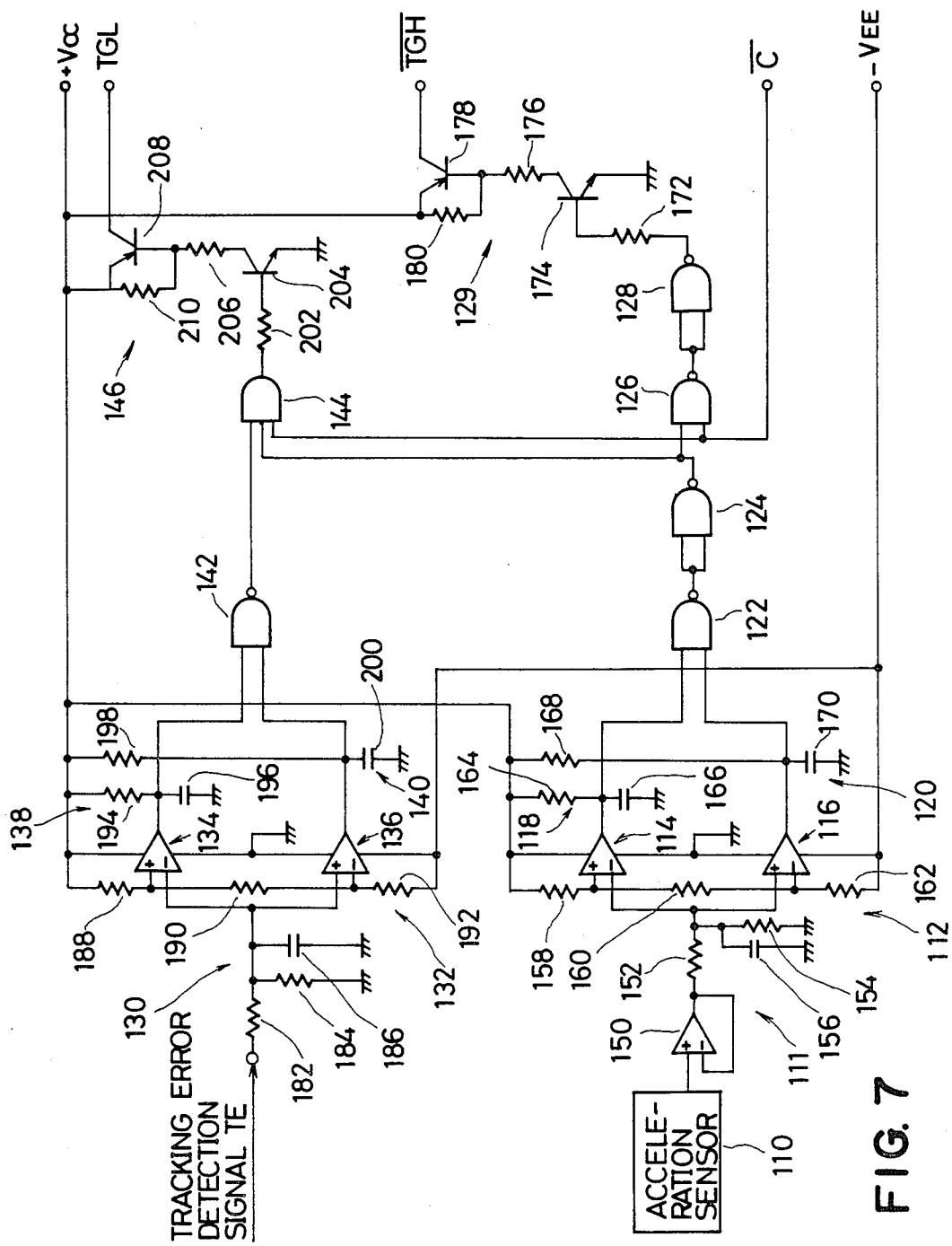
FIG. 7 is a circuit diagram showing a specific example of the circuit in FIG. 5.

A specific example of the circuit of FIG. 5 is shown in FIG. 7. In FIG. 7, The buffer and low-pass filter circuit 111 is composed of a buffer amplifier 150, resistors 152 and 154 and a capacitor 156. The bias circuit 112 sets the positive and negative threshold values by resistors 158, 160 and 162.

The peak hold circuit 118 is composed of a resistor 164 and a capacitor 166. When the acceleration sensor output has exceeded the positive threshold value and the output of the comparator 114 thereby is turned to "0", the capacitor 166 is discharged and thereafter is charged with a time constant determined by the resistor 164 and the capacitor 166. The peak hold circuit 118 therefore produces a signal "0" for a predetermined period of time when the detected acceleration has exceeded the positive threshold value. The peak hold circuit 120 likewise is composed of a resistor 168 and a capacitor 170 and produces a signal "0" for a predetermined period of time when the detected acceleration has exceeded the negative threshold value.

The addition circuit 122 is composed of a NAND circuit and produces a signal "1" when at least one of the outputs of the peak hold circuits 118 and 120 has been turned to "0" (i.e., when the acceleration sensor output has exceeded the positive or negative threshold value).

The output of the NAND circuit 122 is inverted by the inverter 124 and applied to the drive circuit 129 through the NAND circuit 126 and the inverter 128.

In the drive circuit 129, the output of the inverter 128 is applied to the base of a transistor 174 through a resistor 172. The emitter of the transistor 174 is grounded and its collector is connected to the base of a transistor 178 through a resistor 176. The transistor 178 has its emitter connected to voltage source +Vcc, a resistor 180 connected between the base and emitter of the transistor 178 and the output of the drive circuit 129 is derived from its collector. When the music piece selection command $\overline{C}$ (="0") has not been given and the acceleration sensor output has not exceeded the threshold value, the output of the inverter 128 is "1" and, accordingly, the transistors 174 and 178 are ON and the gain up command $\overline{TGH}$ is "1" so that the servo loop gain is not changed to the high gain. When the music piece selection command $\overline{C}$ (="0") has been given or the acceleration sensor output has exceeded the threshold value, the output of the inverter 128 is turned to "0" and the transistors 174 and 178 are not turned on so that the gain up command $\overline{TGH}$="0" is produced and the servo loop gain is changed to the high gain.

The low-pass filter 130 is composed of resistors 182 and 184 and a capacitor 186. The bias circuit 132 sets the positive and negative threshold values by resistors 188, 190 and 192.

The peak hold circuit 138 is composed of a resistor 194 and a capacitor 196 and produces a signal "0" for a predetermined period of time when the tracking error detection signal TE has exceeded the positive threshold value. The peak hold circuit 140 likewise is composed of a resistor 198 and a capacitor 200 and produces a signal "0" for a predetermined period of time when the tracking error detection signal TE has exceeded the negative threshold value.

The addition circuit 142 is composed of a NAND circuit and produces a signal "1" when at least one of the outputs of the peak hold circuits 138 and 140 has been turned to "0" (i.e., the tracking error detection signal TE has exceeded the threshold value).

The output of the NAND circuit 142 is applied to the drive circuit 146 through the AND gate 144.

In the drive circuit 146, the output of the AND gate 144 is applied to the base of a transistor 204 through a resistor 202. The emitter of the transistor 204 is grounded and its collector is connected to the base of a transistor 208 through a resistor 206. The transistor 208 has its emitter connected to the power source +Vcc and a resistor 210 connected between its base and emitter and the output of the drive circuit 146 is derived from its connector. When the music piece selection command $\overline{C}$ (="0") has not been given, the acceleration sensor output has not exceeded the threshold value and the tracking error detection signal TE has exceeded the threshold value, the output of the AND gate 144 is "1" and the transistors 204 and 208 are ON so that the gain down command TGL="1" is produced and the servo loop gain is changed to the low gain. In other conditions, the output of the AND gate 144 is "0" and the transistors 204 and 208 are therefore OFF so that the gain down command TGL is "0" and the servo loop gain is not changed to the low gain.

Figure 8:
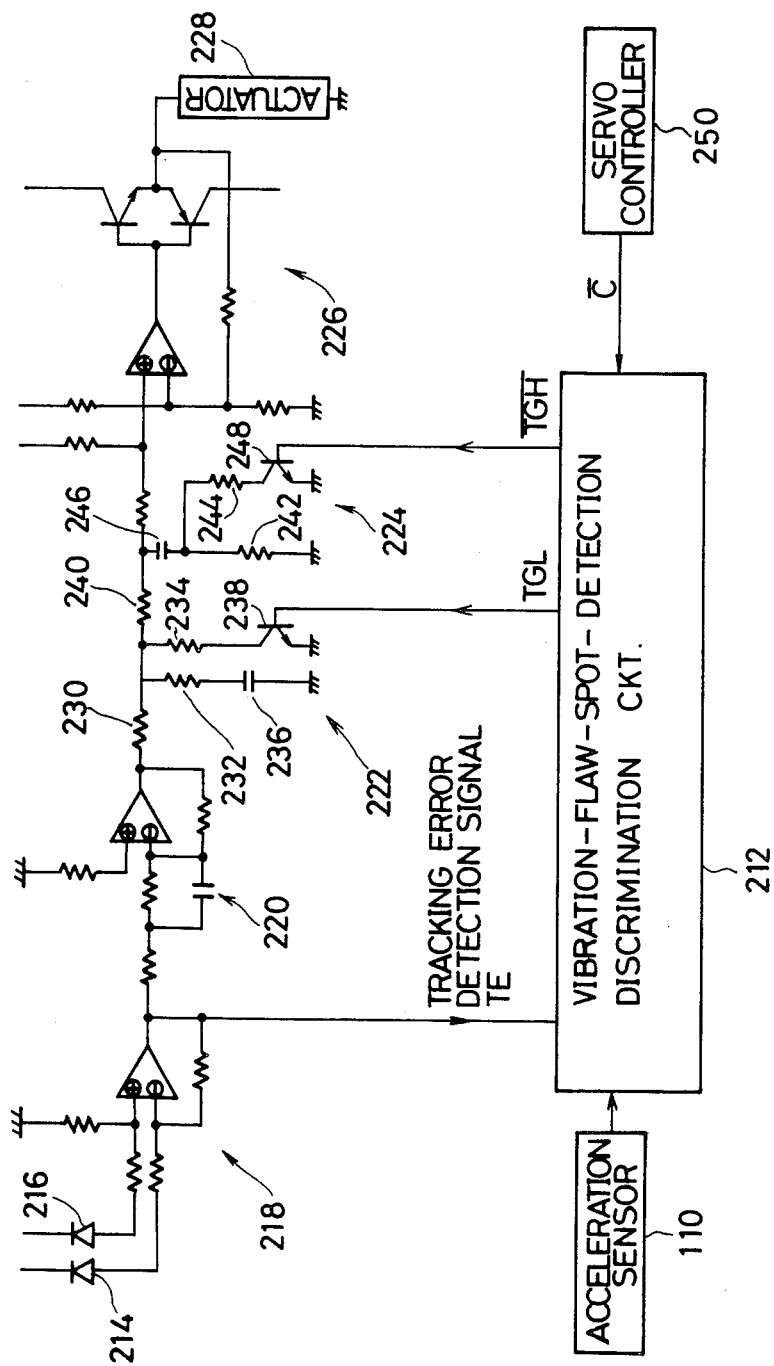
FIG. 8 is a circuit diagram showing an example in which this embodiment has been applied to the tracking control.

An example in which the servo circuit of the second embodiment is applied to the tracking control is shown in FIG. 8.

In FIG. 8, a vibration-flaw-spot detection discrimination circuit 212 is composed, for example, of the circuit shown in FIG. 5.

The outputs of PIN diodes 214 and 216 (in case of the three beam system) for detecting a tracking error are applied to a tracking actuator 228 for tracking control through a preamplifier 218, a phase compensation amplifier 220, a gain down circuit 222, a gain up circuit 224 and a drive amplifier 226.

The gain down circuit 222 is composed of resistors 230, 232 and 234, a capacitor 236 and a transistor 238. The gain up circuit 224 is composed of resistors 240, 242 and 244, a capacitor 246 and a transistor 248.

The vibration-flaw-spot detection discrimination circuit 212 receives the output of the acceleration sensor 110, the tracking error detection signal TE and the music piece selection command C from a servo controller 250 and produces the servo down command TGL and the servo up command $\overline{TGH}$ as shown in the following table.

|  | TGL | $\overline{TGH}$ |
|---|---|---|
| no turbulence | 0 | 1 |
| during selection of music | 0 | 0 |
| during vibration | 0 | 0 |
| during flaw or spot | 1 | 1 |
| during selection of music and vibration | 0 | 0 |
| during selection of music and flaw or spot | 0 | 0 |
| during vibration and flaw or spot | 0 | 0 |

When the gain down command TGL is "1", the transistor 238 of the gain down circuit 222 is turned on and the servo loop gain is changed to the low gain. In this example, the gain is changed to the low gain uniformly in entire frequency range. In view of the fact that the frequency component of the tracking error detection signal TE is mainly high due to a flaw, spot or the like, the gain only in the high frequency may be changed to the low gain.

When the gain up command $\overline{TGH}$ is "0", the transistor 248 of the gain up circuit 224 is turned off and the servo loop gain is changed to the high gain.

When the gain down command TGL is "0" and the gain up command $\overline{TGH}$ is "1", the transistor 238 is OFF and the transistor 248 is ON so that the servo loop gain is maintained at the normal gain.

In FIG. 8, an example in which the embodiment has been applied to the tracking servo control has been shown. However, this embodiment is applicable also to a focus servo control. Further, this embodiment is applicable not only to a Compact Disc player and a video disc player but to any servo circuit which causes the pickup head to follow up a recording medium such as one in a tape recorder.

According to this embodiment, whether the servo error signal is due to the external vibration or the recording medium conditions can be clearly discriminated by judging that it is due to the external vibration if the acceleration sensor output is large and that it is due to the recording medium conditions if the acceleration sensor output is small and the servo error signal is large. By variably controlling the servo loop gain in accordance with the result of the discrimination, the anti-vibration characteristics and the tracing capability for the recording medium can both be satisfied.

What is claimed is:

1. A servo circuit for an information recording and/or reproducing apparatus having a main body, a pickup head, and a servo loop for positioning the pickup head relative to tracks on a recording medium, the servo circuit comprising:

vibration detection means for detecting a level of relative mechanical vibration of the pickup head with respect to the recording medium and producing a first gain changing signal for changing a gain of the servo loop to a high gain when the level of the detected mechanical vibration is higher than a predetermined value and a second gain changing signal for changing the servo loop gain to a low gain when the level is lower than the predetermined value;

high gain intruding means, coupled to the servo loop, for producing a third gain changing signal for changing the servo loop gain to a post-track-jumping gain greater than the low gain immediately after the track jumping operation even when the detected level of mechanical vibration is lower than the predetermined value; and gain changing means responsive to said first, second and third gain changing signals for changing the servo loop gain between the high gain, the low gain and the post-track-jumping gain.

2. A servo circuit as defined in claim 1 wherein: said servo loop produces an error signal, said mechanical vibration includes a vibrational component of a predetermined frequency, said vibration detection means includes filter means for detecting an error signal component corresponding to the predetermined frequency of the mechanical vibration, and said vibration detection means includes comparison means, coupled to the filter means, for comparing the magnitude of the error signal component with at least one predetermined threshold level.

3. A servo circuit as defined in claim 1 wherein said vibration detection means comprises acceleration detection means for detecting an acceleration level of the main body of the apparatus including said pickup head and detecting the mechanical vibrations by the level of the detected acceleration.

4. A servo circuit as defined in claim 3 further comprising recording medium condition detection means responsive to an output of said acceleration detection means and an error signal in said servo loop for detecting recording medium defects such as spots and flaws on the recording medium and providing a fourth gain changing signal for changing the servo loop gain to a defect gain that is lower than said low gain when the level of the mechanical vibration is lower than the predetermined value and the level of the error signal is higher than a predetermined threshold value, and another gain changing means responsive to said fouth gain changing signal for changing the servo loop gain to said defect gain.

5. A servo circuit for positioning a pickup head in the body of a recording and/or reproducing apparatus to keep the pickup head in tracking relationship to tracks on a recording medium, comprising:
   position error detecting means, coupled to the pickup head, for producing a tracking error signal representing an error in the position of the pickup head relative to a track;
   vibrational component extracting means, coupled to the position error detection means, for extracting a time variant component of the tracking error signal having a predetermined frequency for indicating that the pickup head may be out of position relative to the track as a result of an external mechanical vibration applied to the body of the recording and/or reproducing apparatus; and
   servo loop gain control means, coupled to the extracting means and responsive to the extracted time variant component of the tracking error signal, for setting a servo loop gain of the servo circuit to a first gain when the extracted component is less than or equal to a predetermined threshold value and to a second gain, higher than the first gain, when the extracted component exceeds the predetermined threshold level.

6. A servo circuit according to claim 5 further comprising peak hold means for holding the servo loop gain at the higher second gain for a predetermined length of time after the threshold value is exceeded by the extracted component.

7. A closed loop servo system for positioning an information accessing transducer of an information recording and/or reproducing apparatus relative to a track on a recording medium, where a main body portion of the apparatus is subject to the force of external vibrations, comprising:
   acceleration sensing means, coupled to the main body portion of the apparatus, for detecting an accelerated movement of the main body portion of the apparatus and producing an acceleration signal representative of the magnitude of the detected acceleration;
   tracking error sensing means, coupled to receive an output signal of the transducer, for detecting an error indicating component of the transducer output signal which indicates a possible error in the position of the transducer relative to the track and producing a tracking error signal representative of the detected error indicating component;
   error cause discrimination means, responsive to the acceleration signal and the tracking error signal, for determining whether a crossing of the tracking error signal past a predetermined threshold level corresponds to external mechanical vibrations being applied to the main body of the apparatus, whether the crossing is due to a flaw in the recording medium, or due to both a flaw and external vibrations; and
   servo loop gain changing means, responsive to the error cause discrimination means, for changing a loop gain of the servo system in accordance with the determination of the discrimination means as to whether the threshold crossing corresponds to external vibrations or not.

8. A servo system for use with a transducer positioning system which positions a movable transducer relative to one or more tracks on a recording medium, comprising:
   (a) tracking error sensing means, coupled to the transducer, for sensing a change in transducer output that may be due to a positional error between the transducer and the one or more tracks, the tracking error sensing means producing a tracking error signal representative of the change in the transducer output;
   (b) variable gain means, coupled to the tracking error sensing means, for multiplying the tracking error signal by a variable gain factor and supplying the multiplied tracking error signal to the transducer positioning system;
   (c) discrimination means, coupled to the tracking error sensing means, for discriminating between changes in the transducer output that are probably due to external mechanical vibrations and those that are probably due to other causes; and
   (d) gain control means, coupled to the discrimination means and the variable gain means, for setting the variable gain factor at a normal level when the discrimination means determines that the changes in the transducer output are probably not due to external mechanical vibrations and for increasing the variable gain factor to a high gain, larger than the normal gain, when the discrimination means determines that the changes in the transducer output are probably due to external mechanical vibrations.

9. A servo system according to claim 8 wherein the discrimination means includes filter means, coupled to the tracking error sensing means, for extracting a predetermined frequency component of the tracking error signal corresponding to a mechanical vibration of the servo system as a whole.

10. A servo system according to claim 9 wherein the discrimination means further includes threshold means, coupled to the filter means, for determining whether the extracted frequency component exceeds a predetermined threshold value and producing a peak signal in response thereto; and
   the gain control means includes peak holding means, responsive to the peak signal, for holding the variable gain factor at the high gain level for a predetermined length of time after the extracted frequency component exceeds the predetermined threshold value.

11. A servo system according to claim 8 wherein the gain control means includes override means, responsive to a positioning change of the transducer from one track to another, for setting the variable gain factor to a post-jump level larger than the normal level immediately after a track jump operation is performed.

12. A servo system according to claim 8 wherein the discrimination means includes an acceleration sensing means for sensing a magnitude of acceleration of the servo system as a whole and outputting an acceleration signal representative thereof.

13. A servo system according to 12 wherein the gain control means includes acceleration threshold means, coupled to the acceleration sensing means, for determining whether the acceleration signal exceeds a predetermined acceleration threshold and outputting a peak acceleration signal in response thereto.

14. A servo system according to claim 13 wherein the gain control means further includes an acceleration peak holding means, coupled to the acceleration threshold means and responsive to the peak acceleration signal, for holding the variable gain factor at the high gain level for a predetermined length of time after the acceleration signal exceeds the predetermined acceleration threshold.

* * * * *